Patented Apr. 17, 1945

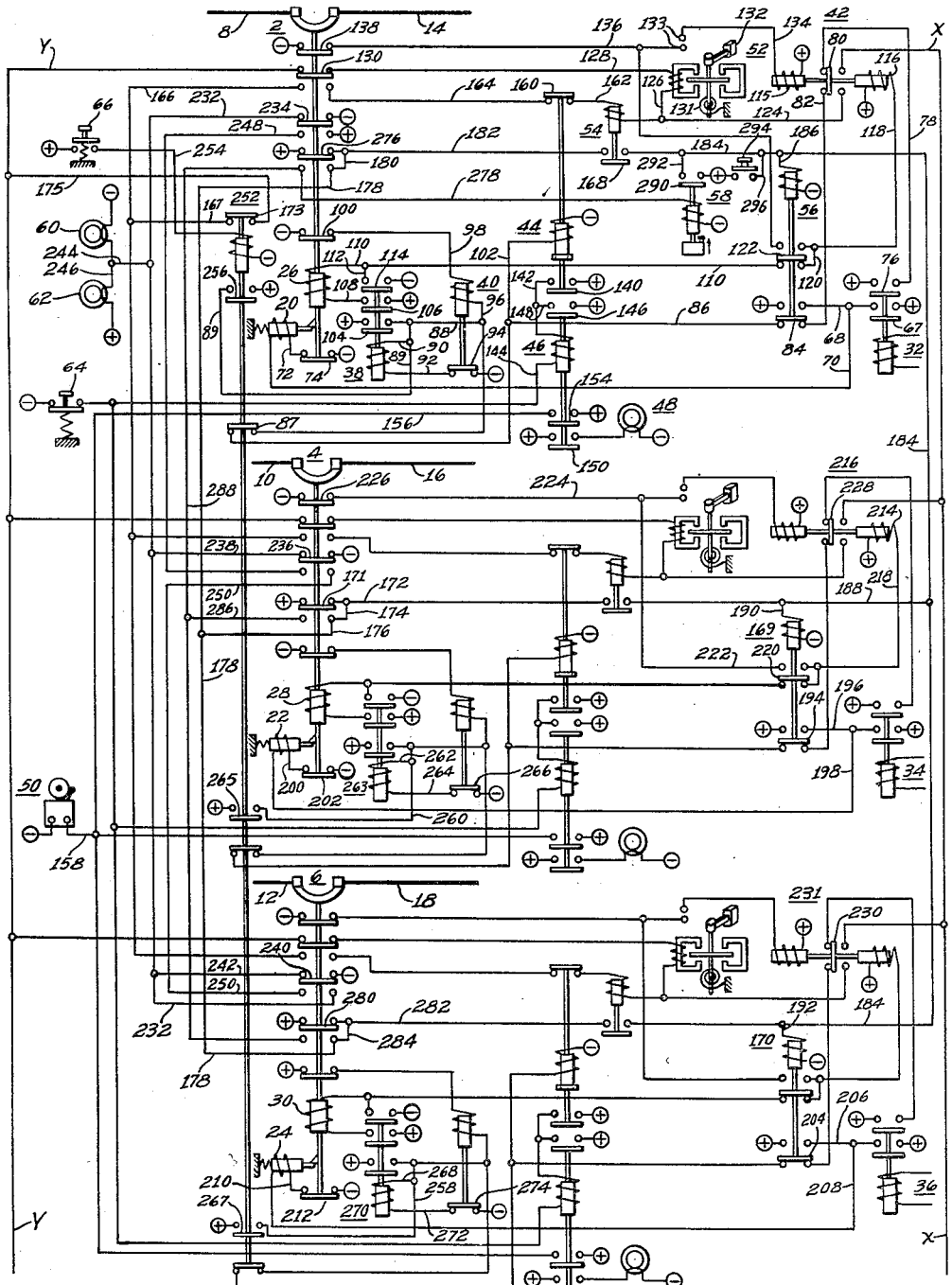

2,374,001

UNITED STATES PATENT OFFICE 2,374,001

AUTOMATIC RECLOSING CIRCUIT BREAKER SYSTEM

Willard A. Derr, Wilkinsburg, Pa., assignor to Westinghouse Electric & Manufacturing Company, East Pittsburgh, Pa., a corporation of Pennsylvania Application October 18, 1941, Serial No. 415,605

8 Claims. (Cl. 175—294)

My invention relates, generally, to automatic reclosing circuit breaker systems, and, more particularly, to a system for controlling the individual circuit breakers or the separate poles of a single circuit breaker, which control the separate conductors of a polyphase circuit.

In the operation of polyphase power systems it has been found desirable to provide separate control for the separate conductors of the polyphase lines so that, when a fault occurs on a single conductor, that conductor may be deenergized and reenergized without affecting the other conductors of the circuit to thereby maintain sufficient power on the circuit to keep the apparatus which is supplied by the system energized until the single conductor can be freed of its fault. However, it is not desirable to maintain power on less than all of the conductors of a polyphase circuit for any appreciable length of time, since a power circuit so operating causes considerable disturbance of neighboring communication channels, and is unable to prevent synchronous machinery from losing synchronism for a very long period of time.

It is an object of the invention, therefore, to provide a control system for the circuit breakers which control the conductors of a polyphase electric power circuit, which shall function to open any circuit breaker on whose associated conductor a fault occurs, to reclose the opened circuit breaker, to open all of the breakers in the event that the originally opened breaker fails to remain closed when reclosed, to open all of the breakers in the event that any of the breakers stay open for more than a predetermined length of time, to indicate when any breaker is closed, to indicate when all breakers are open, and to indicate what breakers have been opened.

These and other objects and advantages of the invention will be apparent from the following detailed description, taken in connection with the accompanying drawing which is a diagrammatic view of an automatic reclosing circuit breaker system embodying the principal features of my invention.

In practicing the invention, circuit breakers 2, 4, and 6 are disposed to connect power supply conductors 8, 10 and 12 with load conductors 14, 16 and 18, respectively, of a three-phase power system. The breakers 2, 4 and 6 have trip coils 20, 22 and 24, respectively, and closing coils 26, 28 and 30, respectively. Protective relays 32, 34 and 36 are connected to energize the separate trip coils of the circuit breakers 2, 4 and 6, respectively, whenever a fault occurs on any of the associated load conductors 14, 16 and 18, respectively.

The protective relay 32 will also function in association with relays 38, 40 and 42 to reclose the circuit breaker 2 immediately after it opens. A relay 44 and a relay 46 also operate in response to the operation of the protective relay 32, and the relay 46 controls a single lamp 48 and an alarm 50. The relay 42 and a timing device 52 function to prevent further reclosure of the circuit breaker 2 unless a predetermined time has elapsed between any reclosure and the succeeding opening of the breaker. The circuit breakers 4 and 6 have relays corresponding to the relays 38, 40, 42, 44, 46 and 52, which function in a similar manner to control the circuit breakers 4 and 6, their associated signal lamps, and the common alarm 50.

A pair of relays 54 and 56 functions in conjunction with the relay 42 which is associated with the control system for the breaker 2, and corresponding relays associated with the breakers 4 and 6, function, in response to the second opening of any breaker within the time interval determined by the timing device 52, to open all of the breakers.

A timing relay 58 functions in response to the opening of any of the breakers 2, 4 and 6 for a predetermined length of time to open the other circuit breakers. Signal lamps 60 and 62 are controlled by the positions of the circuit breakers 2, 4 and 6 to indicate when all of the breakers are open and when any one or more of the breakers are closed, respectively. The alarm 50 and the signal lamps 48 and the corresponding lamps associated with the breakers 4 and 6 may be deenergized by a reset switch 64. The breakers may be closed simultaneously when desired by the master control switch 66.

Considering the invention in greater detail, the protective relays 32, 34 and 36 may be of any suitable type connected in any well known manner to respond to faults on the individual load conductors 14, 16 and 18. When the protective relay 32 operates, it closes an energizing circuit for the tripping coil 20 of the circuit breaker 2 which extends from positive potential through the contact element 67 of the relay 32, conductors 68 and 70, the winding of the tripping coil 20, a conductor 72, and a contact element 74 actuated by the circuit breaker 2 to negative potential. The energization of the tripping coil 20 will cause the circuit breaker 2 to open. The operation of the protective relay 32 also closes an energizing circuit for a relay 38 which extends from positive potential through the contact element 76 of the relay 32, a conductor 78, a contact element 80 of the relay 42, a conductor 82, a contact element 84 of the relay 56, conductors 86 and 102, a back contact element 87 of the relay 256, conductors 96, 88, 89 and 90, the winding of the relay 38, a conductor 92, and a contact element 94 of the relay 40 to negative potential. The relay 40 is also momentarily energized by the actuation of the relay 32 since one terminal of its winding is connected to the conductor 96, and the other terminal is connected by conductor 98 and a contact element 100 which is actuated by the circuit breaker 2 to negative potential. The relay 44 is also energized by the actuation of the relay 32, one terminal of its winding being connected to the conductor 102, and the other terminal being connected to negative potential.

The momentary actuation of the relay 40 by the relay 32 until the circuit breaker opens to cause the contact element 100 to break the energizing circuit of the relay 40 will prevent the relay 38 from being fully actuated by moving the contact element 94 in the energizing circuit of the relay 38 to open circuit position until the circuit breaker 2 has opened to deenergize the relay 40. When the relay 38 is fully actuated, its contact element 104 will close its own holding circuit extending from positive potential through the contact element 104, conductors 88, 89 and 90, the winding of the relay 38, the conductor 92 and the contact element 94 to negative potential. The actuation of the relay 38 will cause it to complete an energizing circuit for the closing winding 26 of the circuit breaker 2 which extends from positive potential through a contact element 106 of the relay 38, a conductor 108, the closing winding 26 of the circuit breaker 2, conductors 110 and 112, and a contact element 114 of the relay 38 to negative potential.

The relay 42 is a double winding relay having windings 115 and 116 which, when separately energized, move the contact element 80 to left-hand circuit-closing position and right-hand circuit-closing position, respectively, and the contact element 80 remains in the circuit closing position to which it is moved by the energization of one of the relay windings until moved into the other position by the energization of the other relay winding. When the relay 38 is actuated, its contact element 114 closes an energizing circuit for the winding 116 of the relay 42 which extends from positive potential through the winding 116, conductors 118 and 120, a contact element 122 of the relay 56 in back contact position, conductors 110 and 112 and the contact element 114 of the relay 38 to negative potential. The contact element 80 of the relay 42 will now be moved to the right-hand circuit-closing position to thus break the original energizing circuit for the relay 38 by the movement of the relay contact element 80 from its left-hand circuit-closing position, and preventing further energization of the relay 38 by the protective relay 32 until the contact element 80 of the relay 42 is again moved to the left-hand circuit-closing position.

When the circuit breaker 2 is closed by its closing coil 26, the time delay device 52 will be energized in a circuit which extends from a conductor X, which may be connected to one terminal of a suitable source of alternating current power, through the contact element 80 in the right-hand position, conductors 124 and 126, the winding of the timing device 52, a conductor 128, and a contact element 130 which is actuated by the circuit breaker 2 to a conductor Y which may be connected to the other terminal of the alternating current source of power.

The timing device 52 may be any suitable alternating current motor such as a single-phase synchronous motor or an induction disk-type motor having a rotor driven against the return bias of a spring element 131 and driving a contact element 132 which engages stationary contact elements 133 after a predetermined interval of energization of the timing device 52. The contact element 132, after the time interval predetermined by the timing device 52, will close an energizing circuit for the winding 115 of the relay 42 which extends from positive potential through the winding 115, a conductor 134, the contact element 132 in engagement with the contact elements 133, a conductor 136 and a contact element 138 actuated by the circuit breaker 2 to negative potential. The energization of the relay winding 115 will move the contact element 80 of the relay 42 from the right-hand circuit-closing position to deenergize the winding of the timing device 52 and permit the contact element 132 to be returned to its full-open position by the spring element 131, and will move to the left-hand circuit-closing position to set up the energizing circuit for the relay 38 to be completed should any further actuation of the protective relay 32 occur.

When the relay 44 is actuated by the relay 32, its contact element 140 closes an energizing circuit for the relay 46, extending from positive potential through the contact element 140, a conductor 142, the winding of the relay 46, a conductor 144, and a contact element of the release switch 64 to negative potential. The actuation of the relay 46 will cause its contact element 146 to close a holding circuit for the relay 46 extending from positive potential through the contact element 146, conductors 148 and 142, the winding of the relay 46 a conductor 144, and the contact element of the release switch 64 to negative potential. The contact element 150 of the relay 46 will close an obvious energizing circuit for the signal lamp 48. A contact element 154 of the relay 46 will energize the alarm 50 in a circuit extending from positive potential through the contact element 154, conductors 156 and 158 and the alarm 50 to negative potential.

The relay 44 is a slow to release relay so timed that the contact element 160 will not move to circuit-closing position upon the release of the relay 44 until the circuit breaker has had sufficient time to close, so that the circuit controlled by the contact element 160 will not be closed before the first reclosure of the circuit breaker 2. If, after the closure of the circuit breaker before the timing device 52 has closed its contact element 132 and while the contact element 80 is still in the right-hand circuit-closing position, the protective relay 32 should again be actuated, the circuit breaker 2 will be tripped as explained hereinbefore by the contact element 67 of the protective relay 32 and the contact element 130 which is actuated by the circuit breaker 2 will move to back contact position to close an energizing circuit for the relay 54 which extends from the conductor X through the contact element 80, the conductor 124, the winding of the relay 54, a conductor 162, the contact element 160 of the relay 44, a conductor 164, the contact element 130, a conductor 166, a conductor 167, a contact element 173 of a relay 252 and a conductor 175 to the conductor Y. The actuation of the relay 54 will cause its contact element 168 to close energizing circuits for the windings of the relay 56 and relays 169 and 170 which are the relays associated with the circuit breakers 4 and 6, respectively, corresponding to the relay 56 which is associated with the circuit breaker 2. The energizing circuit for the relay 56 extends from the positive potential through a contact element 171 actuated by the circuit breaker 4 in front contact position through conductors 172, 174, 176, 178, 180 and 182, the contact element 168 of the relay 54, conductors 184 and 186 and the winding of the relay 56 to negative potential. A similar energizing circuit is established for the relay 169 which has one terminal connected to the conductor 184 by conductors 188 and 190, and the other terminal connected to negative potential, and a like energizing circuit is established for the relay 170 which has one terminal connected to the conductor 184 by conductor 192 and the other terminal connected to negative potential.

The actuation of the relay 169 will cause its contact element 194 to close an energizing circuit for the tripping winding 22 of the circuit breaker 4, which extends from positive potential through the contact element 194 in front contact position, conductors 196 and 198, the tripping winding 22, a conductor 200 and a contact element 202 actuated by the circuit breaker 4 to negative potential. A similar energizing circuit for the tripping winding 24 of the circuit breaker 6 is closed by a contact element 204 of the relay 170 and extends from positive potential through the contact element 204 in front contact position, conductors 206 and 208, the tripping winding 24, a conductor 210 and a contact element 212 actuated by the circuit breaker 6 to negative potential.

The actuation of the relay 169 will also close an energizing circuit for a winding 214 of a relay 216 which corresponds to the winding 116 and the relay 42, respectively. This energizing circuit extends from positive potential through the winding 214, a conductor 218, a contact element 220 of the relay 169 in front contact position, conductors 222 and 224 and a contact element 226 actuated by the circuit breaker 4 to negative potential. This circuit will be established only momentarily because of the movement of the circuit breaker 4 to open circuit position in response to the actuation of its tripping winding 22. The contact element 228 of the relay 216 corresponding to the contact element 80 of the relay 42 will thus be moved to the right-hand circuit-closing position. In a like manner, the energization of the relay 170 will cause the contact element 230 of the relay 231 which corresponds to the contact elements 228 and 80 of the relays 216 and 42, respectively, to move to the right-hand circuit-closing position.

While any of the circuit breakers 2, 4 and 6 is in closed circuit position, negative potential will be applied to the conductor 232, by the circuit breaker 2 through a contact element 234, by the circuit breaker 4 through a contact element 236 and the conductor 238, and by the circuit breaker 6 through a contact element 240 and a conductor 242, and this negative potential and will be applied to one terminal of each of the lamps 60 and 62 through conductors 244 and 246. Since negative potential is applied to the other terminal of the lamp 60, the lamp 60 will not be energized, and since positive potential is applied to the other terminal of the lamp 62, the lamp 62 will be energized while any one of the circuit breakers 2, 4 and 6 is in closed circuit position. When all of the circuit breakers 2, 4 and 6 are in open circuit position, positive potential will be applied to the terminals of the lamps 60 and 62 which are interconnected by the conductor 246 in a circuit which extends from positive potential through the contact element 234 in back contact position, a conductor 248, the contact element 236 in back contact position, a conductor 250, the contact element 240 in back contact position, and the conductors 232, 244, and 246. The lamp 60 will thus be energized and the lamp 62 deenergized.

When the circuit breakers are open and it is desired to close them, the manual control switch 66 may be actuated to close an energizing circuit for a relay 252 which extends from positive potential through the contact element of the control switch 66, a conductor 254, and the winding of the relay 252 to negative potential. A contact element 256 of the relay 252 will close an energizing circuit for the relay 38 which extends from positive potential through the contact element 256, conductors 89 and 90, the winding of the relay 38, the conductor 92, the contact element 94 of the relay 40 to negative potential. A similar energizing circuit is established for the relay 263 by a contact element 265 of the relay 252 for closing the circuit breaker 4 and extends. from positive potential through the contact element 265, conductors 260 and 262 to winding of a relay 263 which corresponds to the relay 38 associated with the circuit breaker 2, a conductor 264 and a contact element 266 which corresponds to the contact element 94 of the relay 40 to negative potential. Likewise, a contact 267 of the relay 252 causes the closure of the circuit 6 by completing an energizing circuit for relay 270 extending from positive potential through the contact element 267, a conductor 258, a conductor 268, the winding of a relay 270 associated with the circuit breaker 6 in the same manner that the relay 38 is associated with the circuit breaker 2, a conductor 272 and a contact element 274 which corresponds to the contact elements 94 and 266 to negative potential.

Should any of the circuit breakers 2, 4 and 6 be tripped for any reason other than the actuation of their associated protective relays 32, 34 and 36, such as failure to properly latch when reclosed, the tripped breaker will cause the actuation of the common time delay relay 58. Should the circuit breaker 2 open, for instance, its contact element 276 will close an energizing circuit for the relay 58 which extends from positive potential through the contact element 171 actuated by the circuit breaker 4, conductors 174, 176 and 178, the contact element 276, a conductor 278 and the winding of the relay 58 to negative potential. Should the circuit breaker 4 be opened, its contact element 171 will close an energizing circuit for the relay 58 which extends from positive potential through a contact element 280 which is actuated by the circuit breaker 6, conductors 282, 284, 178 and 176, the contact element 171 in back contact position, conductors 286, 288 and 278 and the winding of the relay 58 to negative potential. A similar energizing circuit will be closed by the contact element 280 of the circuit breaker 6 in back contact position if the circuit breaker 6 be open. After a predetermined period of energization, the relay 58 will close its contact element 290 to apply a positive potential to the conductor 184 in a circuit which extends from positive potential through the contact element 290 and a conductor 292 to the conductor 184. The relay 56 will thus be energized since it has one terminal connected to the conductor 184 and the other connected to the negative potential. Similarly, the relay 169 associated with circuit breaker 4 will be energized since it has one terminal connected to negative potential and the other terminal connected to the conductor 184 through the conductors 188 and 190 and the relay 170 associated with circuit breaker 6 will be energized since it has one terminal connected to negative potential and the other connected to the conductor 184 through the conductor 192. The energization of the relays 56, 169 and 170 will complete tripping circuits for the circuit breakers 2, 4 and 6, respectively, as explained in detail hereinbefore. Thus when any circuit breaker stays open for the interval of time predetermined by the time delay of closing of the relay 58, which interval is longer than the normal period required by the first reclosure of any circuit breaker when it is opened by its associated protective relay, all of the circuit breakers will be opened to prevent the load circuit from being energized for any appreciable period of time by single-phase potential.

When it is desired to trip the circuit breakers 2, 4 and 6, a manual control switch 294 may be actuated to connect positive potential to the conductor 184 in a circuit which extends from positive potential through the control switch 294 and a conductor 296 to the conductor 184. The application of positive potential to the conductor 184 will energize the relays 56, 169 and 170 which, in turn, will trip all of the circuit breakers as fully explained hereinbefore. When any circuit breaker has been tripped and the alarm 50 and the signal associated with the individual breaker have been energized, the signals may be reset by actuating the reset switch 64 to open the holding circuit of the signal relay 46 which is associated with the circuit breaker 2 and the corresponding signal relays associated with the circuit breakers 4 and 6.

In the operation of the system, when a fault such as a ground fault occurs on any of the conductors 14, 16, and 18, its associated protective relay 32, 34 or 36 will cause the circuit breaker on the circuit on which the fault occurs to open and reclose immediately. If the reclosed circuit breaker remains closed, the timing device associated with the breaker such as the timing device 52 associated with the breaker 2 will be energized, and after its timing interval, will reset the reclosing circuit so that the breaker will again be immediately reclosed if tripped by a fault. However, if the circuit breaker is again tripped by a fault before the time interval of the timing device has elapsed, the other circuit breakers will also be tripped and all of the circuit breakers will be locked in open circuit position until reclosed by the manual control switch 66. When a circuit breaker opens, a common alarm 50 will be sounded and a signal lamp will be illuminated to indicate which of the breakers has opened, and this alarm and signal lamp indication will be retained until the reset button 64 is manually actuated. In order that the operator may have a positive indication of the position of the breakers, a signal lamp 60 is provided and is illuminated only when all of the breakers are in open circuit position, and a signal lamp 62 is illuminated when any of the breakers is in closed circuit position.

It is to be understood that while the invention has been shown and described as controlling a three-phase circuit, it is equally as well applicable to other polyphase circuits such as two-phase or six-phase circuits wherein a part of the circuits may be isolated for a short interval to clear faults which may occur upon the circuits but where it is not desired to operate the load circuit for any appreciable interval of time with less than the full number of load conductors energized.

Thus, it will be seen that I have provided a control system for the circuit breakers which control the conductors of a polyphase electric power circuit which shall function to open any circuit breaker on whose associated conductor a fault occurs, to reclose the opened circuit breaker, to open all of the breakers in the event that the originally open breaker fails to remain closed when reclosed, to open all the breakers in the event that any of the breakers stays open for more than a predetermined length of time, to indicate when any breaker is closed, to indicate when all breakers are open, and to indicate when breakers have been opened.

In compliance with the requirements of the patent statutes, I have shown and described herein a preferred embodiment of my invention. It is to be understood, however, that the invention is not limited to the precise construction shown and described herein, but is capable of modification by one skilled in the art, the embodiment herein shown being merely illustrative of the principles of my invention.

I claim as my invention:

1. In a control system for a plurality of circuit breakers which control the separate phase conductors of a polyphase circuit, means including a fault responsive relay responsive to faults on the individual phase conductors of the circuit for automatically opening the circuit breaker which controls the conductor on which the fault occurs, means controlled by said fault responsive relay for automatically reclosing any such opened breaker, means for opening each of the other breakers automatically in the event that the originally opened breaker is again opened when reclosed within a predetermined time interval, a timing relay common to all the breakers, means whereby said timing relay causes all of said circuit breakers to open after a predetermined period of time of greater duration than the aforesaid predetermined time interval, and means responsive to the position of any one of the circuit breakers for continuously energizing said timing relay so long as any one of the circuit breakers is open.

2. In a control system for a plurality of circuit breakers which control the separate phase conductors of a polyphase circuit, opening means for each of said circuit breakers, closing means for each of said circuit breakers, a control system for each of said circuit breakers comprising fault responsive means responsive to faults on the individual conductor which is controlled by the circuit breaker, means responsive to the operation of the fault responsive means for actuating only the associated circuit breaker opening means, control relay means responsive to the operation of the fault responsive means and the opening of the circuit breaker for actuating the circuit breaker closing means to effect a reclosure of the breaker, relay means responsive to the operation of the circuit breaker closing means for rendering the breaker closing means inoperative to respond to said fault responsive means, a timing device, means responsive to the operation of the said control relay means for initiating the operation of said timing device, means responsive to the timing device after a predetermined time interval of operation of the timing device for rendering said control relay means again operative to respond to the fault responsive means, and means individual to each breaker responsive to their opening of the circuit breaker during the said predetermined time interval for immediately actuating the opening means of each of the other breakers.

3. In a control system for a plurality of circuit breakers which control the separate phase conductors of a polyphase circuit, opening means for each of said circuit breakers, closing means for each of said circuit breakers, a control system for each of said circuit breakers comprising fault responsive relay means responsive to faults on the individual conductor which is controlled by the circuit breaker, means responsive to the operation of any one of the fault responsive means for actuating its associated circuit breaker opening means, means responsive to the operation of the fault responsive means and the opening of the circuit breaker for actuating the circuit breaker closing means, means responsive to the operation of the circuit breaker closing means for rendering the breaker closing means inoperative to respond to said fault responsive means, a timing device associated with each of the breakers, means responsive to the operation of the breaker closing means and the closure of the breaker for actuating its associated timing device, means responsive to the timing device after a predetermined time interval of operation of the timing device for rendering said breaker closing means operative to again respond to the fault responsive means, means responsive to the reopening of the circuit breaker during the said predetermined time interval for actuating the opening means of each of the other breakers, an additional timing device common to all breakers, means responsive to the opening of any one of the circuit breakers for actuating said second timing device, and means responsive to the actuation of said second timing device for a predetermined interval of time of greater duration than the aforesaid predetermined time interval for opening the remainder of the circuit breakers.

4. In a control system for a plurality of circuit breakers which control the separate conductors of a plural conductor circuit, means including fault responsive relay means individual to each conductor responsive to predetermined conditions on any of the separate conductors for opening only the circuit breaker on whose associated conductor the predetermined condition occurs, means controlled by said fault responsive means for automatically reclosing any such opened breaker and for rendering the fault responsive relay means ineffective to effect a subsequent reclosure of the breaker unless it remains closed for a predetermined time interval, and means including a time delay relay associated with each breaker for opening a plurality of the breakers automatically in the event that any such originally opened and reclosed breaker is again opened within a different predetermined time interval of lesser duration than the aforesaid predetermined time interval after the reclosure thereof.

5. In a control system for a plurality of circuit breakers which control the separate conductors of a plural conductor circuit, means including fault responsive relay means individual to each conductor responsive to predetermined conditions on any of the separate conductors for opening any of the circuit breakers on whose associated conductor the predetermined conditions exist, means controlled by said fault responsive relay means for automatically reclosing any such opened breaker immediately upon the opening thereof, means individual to each breaker for opening all of the other breakers automatically in the event that the originally opened and reclosed breaker is again opened within a predetermined time interval, and means including time delay relay means common to all the breakers and controlled by electrically interlocked contact members on all the breakers for automatically opening all of the breakers in the event that any one of the breakers is opened for any reason other than in response to said predetermined conditions by said fault responsive means.

6. Means for controlling the respective opening-means and closing-means of a plurality of single-pole circuit-interrupters in the separate phase-conductors of a polyphase line, comprising the combination with said circuit-interrupters, of three protective relaying-means for effecting three predetermined relaying-operations, one for each of the three phase-conductors of said line, circuit-means for energizing the opening-means and the closing-means of only one of the three circuit-interrupters in response to a relaying-operation of its associated protective relaying-means to effect the opening and an immediate reclosure of the breaker, and means including timing relay means individual to each breaker jointly responsive to the initial operation of the protective relaying-means and the reclosure of the interrupter for limiting the number of successive reclosing operations in response to successive operations of the protective relaying-means which will be permitted for any one of said circuit-interrupters to a predetermined number within a predetermined time interval, and time delay relay means individual to each interrupter and initiated into operation by the first operation of the protective relaying means for effecting the energization of the opening means of the other interrupters in the event that the interrupter which has been opened and reclosed does not remain reclosed within said predetermined interval as determined by its individual timing relay means.

7. Means for controlling the respective opening-means and closing-means of three single-pole circuit-interrupters in the three phase-conductors of a three-phase line, comprising the combination with said circuit-interrupters, of three protective relaying-means for effecting three predetermined relaying-operations, one for each of the three phase-conductors of said line, circuit-means for energizing the opening-means and the closing-means of only one of the three circuit-interrupters in response to a relaying-operation of its associated protective relaying-means to open and reclose the interrupter, additional circuit-means individual to each interrupter for energizing only the opening-means thereof, a control relay individual to each interrupter operable to energize said additional circuit means of all three interrupters, and a time delay relay individual to each interrupter operable to effect the operation of its associated control relay in the event that the reclosed interrupter reopens within a predetermined time interval after the reclosure thereof.

8. In a control system for a plurality of circuit breakers which control the separate conductors of a plural conductor circuit, fault responsive relaying means individual to each breaker and responsive to the faulted conditions of the separate conductors for causing an opening operation of only the breaker associated with the faulted conductor, control relay means conditioned for operation by the operation of the fault responsive relaying means to open the breaker and finally responsive to the opening of the breaker for automatically reclosing the opened breaker, means controlled by said control relay means for rendering the fault responsive relaying means ineffective to again initiate a reclosure of the breaker unless it remains closed for a predetermined time interval after its initial reclosure, and relay means individual to each breaker for effecting opening operations of the remaining breakers upon the opening of the breaker associated with the faulted conductor in the advent that said breaker reopens within said predetermined time interval.

WILLARD A. DERR.